Feb. 19, 1946.     J. N. GOOD     2,395,180
CONTROL MECHANISM
Original Filed July 30, 1942
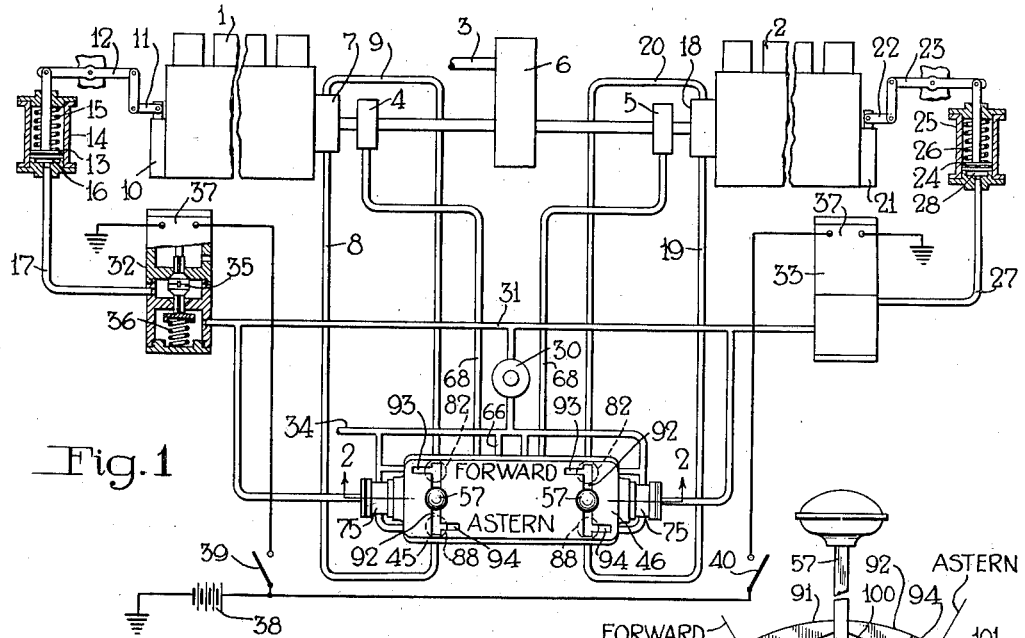
Fig. 1
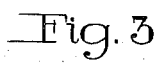
Fig. 3
Fig. 2
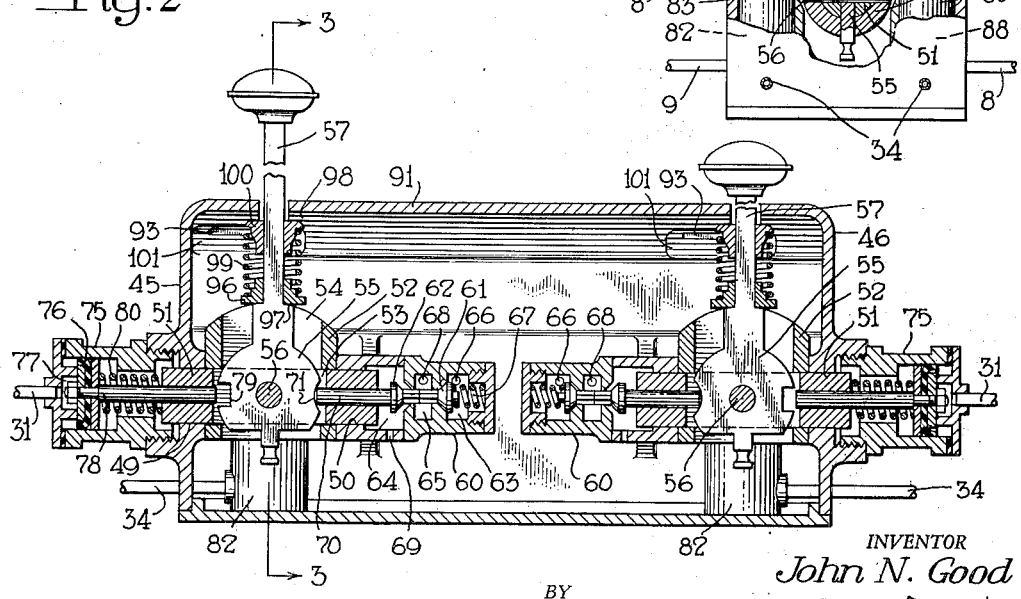
INVENTOR
John N. Good
BY
ATTORNEY Patented Feb. 19, 1946

2,395,180

UNITED STATES PATENT OFFICE 2,395,180

CONTROL MECHANISM

John N. Good, Wilmerding, Pa., assignor to The Westinghouse Air Brake Company, Wilmerding, Pa., a corporation of Pennsylvania Original application July 30, 1942, Serial No. 452,950. Divided and this application November 27, 1943, Serial No. 512,007

3 Claims. (Cl. 74—471)

This invention relates to control mechanism and more particularly to means embodying a single control member arranged to selectively control a plurality of devices; the present application being a division of my copending application, Serial No. 452,950, filed July 30, 1942.

The principal object of the invention is the provision of an improved means of the above type.

Other objects and advantages will be apparent from the following more detailed description of the invention.

In the accompanying drawing; Fig. 1 is a diagrammatic view, partly in section and partly in outline, of a control system for a plurality of engines embodying the invention; Fig. 2 is a vertical sectional view of an operator's controller taken on the line 2—2 in Fig. 1; and Fig. 3 is a sectional view taken on the line 3—3 in Fig. 2.

Description

In the drawing, the reference numerals 1 and 2 indicate two internal combustion engines which may be of the Diesel type, and both of which are arranged to be connected to operate a common propeller shaft 3 through the medium of suitable clutches 4 and 5, respectively, and a device 6 containing suitable gearing (not shown).

The clutches 4 and 5 may be of any desired type arranged for operation by fluid under pressure supplied thereto to connect the respective engine to the propeller shaft 3 and to disconnect said engine from the propeller shaft upon the release of such fluid under pressure.

Associated with engine 1 is a pneumatic starting control device 7 arranged to be conditioned by fluid under pressure supplied through a pipe 8 to provide for operation of said engine in one direction and through a pipe 9 to provide for operation of said engine in the reverse direction.

A fuel supply device 10 is associated with engine 1 and embodies an adjustable member 11 for varying the fuel supply to and thereby the speed or power output of said engine. For adjusting the member 11 it may be connected to one end of a lever 12 which is fulcrumed intermediate its ends. The opposite end of lever 12 may be connected to a piston 13 contained in a cylinder 14 and subject on one side to the pressure of a calibrated spring 15. At the opposite side of piston 13 is a pressure chamber 16 connected to a pipe 17 through which fluid under pressure may be supplied to and released from said chamber for adjusting the position of piston 13 in cylinder 14 and thereby the position of the fuel governing member 11 in accordance with the pressure of such fluid. With chamber 16 at substantially atmospheric pressure spring 15 will urge the piston 13 to the position shown which may be assumed to be idling position to provide for operation of the engine at a chosen low or idling speed. When the piston 13 is moved in its cylinder by fluid pressure supplied to chamber 16 to a position, for instance, substantially midway of the length of the cylinder 14, it may be assumed that the fuel supply member 11 will be positioned to provide for maximum speed or power output of the engine 1. Intermediate positions of the piston 13, dependent upon the pressure of fluid in chamber 16, will therefore provide corresponding intermediate degrees of speed or power output of engine 1.

Associated with engine 2 is a pneumatic starting control device 18 like the device 7 but controlled by fluid under pressure from pipes 19 and 20. The engine 2 has a fuel governing device 21 embodying a member 22 adjustable by a lever 23 in accordance with the position of a piston 24 in a cylinder 25 as determined by the pressure of a spring 26 acting on one side of the piston and the opposing pressure of fluid supplied through a pipe 27 to a pressure chamber 28 to act on the opposite side of said piston. The piston 24 may have a position such as shown to provide for operation of the engine at idling speed and other positions depending upon the pressure of fluid in chamber 28 to provide corresponding speeds or degrees of power output as described in connection with piston 13 associated with engine 1.

A manually adjustable control device 30 of any suitable type is provided for controlling the pressure of fluid in pressure chambers 16 and 28 and thereby the adjustment of pistons 13 and 24 and the speed or power output of engines 1 and 2, respectively. To accomplish this end the device 30 is connected to a pipe 31 which is arranged to be opened through cutoff valve devices 32 and 33 to pipes 17 and 27 leading to the pressure chambers 16 and 28, respectively. With the pressure chambers 16 and 28 thus connected to the control device 30 said device is operative to either open both of said chambers to the atmosphere to provide for operation of engines 1 and 2 at their idling speeds or to supply fluid at any desired pressure from a fluid pressure supply pipe 34 to both of said chambers to cause operation of said engines at a chosen higher speed or degree of power output.

The cutoff valve device 32 is provided to render the engine 1 non-responsive to an increase in fluid pressure provided in pipe 31 by operation of control valve device 30, if it is desired that the engine 1 be disconnected from the propeller shaft 3 and be operating at idling speed, while the engine 2 is operating said shaft to propel the craft at a speed determined by operation of the control valve device 30. The cutoff valve device 33 is provided to accomplish the same result, with respect to engine 2.

Both of the cutoff valve devices 33 and 32 may be of the same construction, each comprising a double beat valve 35 having one position for opening communication between pipe 31 and the respective pipe 17 or 27 and another position for closing such communication and opening the latter pipe 17 or 27 to atmosphere. A spring 36 in each cutoff valve device is operative to move the double beat valve 35 to the position for connecting pipe 31 to pipe 17 or 27, while an electromagnet 37 is arranged for operation upon energization to move the double beat valve to its other position for closing communication between pipe 31 and pipe 17 or 27 and opening the latter to atmosphere.

The electromagnets 37 of the cutoff valve devices 32 and 33 are arranged to be energized by electric current from any suitable source such as a battery 38. A manually operative switch 39 is provided in the circuit to magnet 37 of the cutoff valve device 32, while a corresponding switch 40 is provided in the circuit to the magnet of the cutoff valve device 33. Closing these switches is arranged to effect energization of the respective electro-magnets while opening the switches is arranged to effect deenergization of said magnets. With the magnets deenergized, it will therefore be seen that the engines 1 and 2 will operate in accordance with operation of the manual control device 30, and that with the magnets energized the engines will be nonresponsive to operation of the control device 30 and will operate only at idling speed. These switches and the cutoff valve devices 32 and 33 are therefore effective to cut out either one engine or the other, as desired.

A manual control device 45 is provided for controlling the starting control device 7 and the clutch 4 for engine 1. This manual control device also embodies means controlled from pipe 31 for preventing operation of clutch 4 to connect engine 1 to the propeller shaft 3 with either engine operating above a chosen low speed, such as idling. A similar manual control device 46 is provided for controlling the starting control device 18 and clutch 5 for engine 2 and is also provided with means controlled from the speed control pipe 31 for preventing engagement of clutch 5 with either engine operating above a chosen low speed, such as idling. Means are also provided for preventing operation of both of the manually controlled devices 45 and 46 to connect both engines 1 and 2 to the propeller at the same time when the engines are operating in directions which would cause the propeller to turn in opposite directions.

Each of the two similar control devices 45 and 46 is constructed in accordance with the present invention, and the construction of the former will now be described in detail.

The control device 45 comprises a casing having two spaced aligned bearings 49 and 50 in which a rock shaft 51 is journaled. A cage 52 interposed between and bearing against the adjacent ends of bearings 49 and 50 has aligned openings through which the shaft 51 extends. Between the bearings 49 and 50 the shaft 51 has a slot 53 extending diametrically therethrough and the cage 52 has an aligned slot 54. An operating member 55 of sustantial disk form is disposed in slot 53 and extends into slot 54 and is journaled at its axis on a pin 56. The pin 56 is arranged at right angles to the axis of shaft 51 and is carried in suitable bores in said shaft at opposite sides of slot 53 and in the adjacent portions of cage 52. The thickness of the operating member 55 is less than the width of slots 53 and 54 only sufficiently to provide free rocking movement about the pin 56. The cage 52 being secured to shaft 51 by pin 56 holds the rock shaft 51 against endwise movement.

The operating member 55 is formed on one end of a lever 57 and from the above description it will be seen that the pin 56 provides for rocking of said lever and member on said pin relative to the rock shaft 51 in the direction of the length of said shaft, while said rock shaft provides for movement of said lever and operating member at right angles to the axis of the shaft, the operating member 55 under this latter condition providing an operating connection between said lever and shaft for turning the shaft with the lever.

A starting control valve device 82 is provided in the casing at one side of rock shaft 51 beyond the adjacent end of pin 56. This device comprises a vertically movable plunger 83 (Fig. 3) and valve means (not shown) operable upon downward movement of said plunger to supply fluid under pressure from the supply pipe 34 to the starter control pipe 9 for actuating the starter control device 7 to provide for starting of the engine in one direction. It may be assumed that with the engine 1 operating in this direction the propeller shaft 3 when connected to said engine will cause movement of the ship in a forward direction. Movement of the plunger 83 in an upward direction as viewed in Fig. 3 is arranged to allow release of fluid under pressure from the starter control pipe 9 to provide for stopping of the engine or for starting of the engine in the opposite direction, as will be later described.

For controlling the plunger 83 one end of a lever 84 bears against the plunger. This lever is supported on a pin 85 secured in the casing while the opposite end is provided with a roller 86 arranged to contact a cam surface 87 provided on the cage 52 above one end of pin 56 and adjacent the top of operating member 55. Movement of the member 57 toward the left-hand as seen in Fig. 3 or upward as viewed in Fig. 1, to a position bearing the legend "Forward" is arranged to operate cam 87 and thereby the lever 84 to move the plunger 83 in a downward direction for supplying fluid under pressure to the starter control pipe 9, while movement of said lever back to its normal position shown is arranged to provide for movement of the plunger 83 in the reverse direction for releasing fluid under pressure from pipe 9.

At the opposite side of shaft 51 and beyond the opposite end of pin 56 is a starting control valve device 88 which may be identical to the device 82 and which comprises a plunger 89 operable upon downward movement to supply fluid under pressure from the supply pipe 34 to pipe 8 leading to the starter control device 7 to provide for operation of said device to cause starting of the engine 1 in the direction of the reverse of that attained by the supply of fluid under pressure to pipe 9, or in a direction to cause movement of the ship in an astern direction when connected to the propeller shaft 3, as indicated by the legend "Astern" in Figs. 1 and 3.

A lever 90 like lever 84 is arranged for controlling movement of plunger 89, and the cage 52 is provided with a cam 81 opposite the cam 87 for operating the lever 90. By this construction movement of the operating lever 57 downwardly as viewed in Fig. 1 or in the direction of the right-hand, as viewed in Fig. 3, will actuate the valve device 88 to cause starting of the engine in the direction to provide for astern movement of the ship, while return of the lever 57 to the neutral position shown will provide for operation of the valve device 88 to release fluid under pressure from pipe 8 in order to effect stopping or reversal of the engine.

A more detailed description of the structure and operation of the valve devices 82 and 88 is not deemed essential since devices of this type are well known to those skilled in the art.

The top wall 91 of the casing of the control valve device 45 is provided with a relatively long slot 92 extending at right angles to the axis of rock shaft 51. This slot provides for movement of the lever 57 to either "Forward" position or "Astern" position for actuating the starter control valve devices 82 and 88 respectively for starting the engine 1 in either one direction or in the reverse direction as above described, and to the neutral position for stopping the engine. It will be seen that this slot prevents movement of the lever 57 in any direction except for operating the valve devices 82 or 88.

A clutch control device 60 is associated with the casing bearing 50 beyond the journaled end of shaft 51. This device comprises two oppositely seating poppet valves 61 and 62 arranged in coaxial relation with rock shaft 51 and contained in chambers 63 and 64, respectively. These valves have fluted stems extending toward each other through suitable bores in the device and meeting in a chamber 65. The chamber 63 is connected by a pipe 66 to the fluid pressure supply pipe 34 and contains a spring 67 acting on the valve 61 for seating same and at the same time unseating the valve 62. The chamber 65 is connected by a pipe 68 to the clutch 4 for engine 1. The chamber 64 is open through a passage 69 to the interior of the casing and thus with the atmosphere through openings including slot 92.

The rock shaft 51 between the operating member 55 and valve 62 is provided with an axial bore in which is slidably mounted a plunger 70. One end of this plunger engages the valve 62 while the other end is aligned for engagement by the peripheral surface of the operating member 55 at one side of pin 56. The operating member 55 has in its peripheral surface a recess 71 arranged to receive the adjacent end of plunger 70 when the operating lever 57 is in the vertical position shown in Figs. 1 and 2. With the plunger 70 in recess 71 spring 67 is operative to seat valve 61 and open valve 62 to thereby connect the clutch control pipe 68 to the atmosphere for effecting operation of the clutch 4 to disconnect the engine 1 from the propeller shaft. Movement of the lever 57 from this vertical position in either a clockwise direction or counterclockwise direction, as viewed in Fig. 2, is adapted to turn the operating member 55 to a position in which a portion at either one side or the other of recess 71 is in engagement with the plunger 70 and during such movement to effect movement of the plunger 70 outwardly of shaft 51 to seat valve 62 and unseat valve 61. With the valve 61 thus open fluid under pressure will flow from the supply pipe 34 to pipe 68 and thence to clutch 4 for effecting operation thereof to connect the engine 1 to the propeller shaft 3.

In order that the lever 57 may be operated as just described for controlling the operation of the clutch 4, the top wall 91 of the casing is provided with two oppositely extending slots 93 and 94 opening to the opposite sides of the slot 92 adjacent its opposite ends. It will be seen that since engagement of the clutch 4 is dependent upon movement of the lever 57 in either a clockwise or counterclockwise direction from the position shown in Fig. 2 and thus out of the slot 92, the clutch will be disengaged with the lever in the slot 92 and be engaged only upon movement into the slot 93 or into the slot 94.

In use, let it be assumed that the lever 57 is in its neutral position midway between the ends of slot 92 as shown in Figs. 1 and 3. If it is now desired to start the engine 1 in such a direction as to cause operation of the propeller shaft 3 to move the ship forwardly the lever 57 is moved in slot 92 to "Forward" position for thereby operating the starter control valve device 82 to cause the engine 1 to be started in a direction to obtain forward movement of the ship. After the engine is thus started, the lever 57 is drawn back from the end of slot 92 to a position aligned with slot 93 and then moved into the latter slot for operating the clutch control device 60 to supply fluid under pressure to pipe 68 for actuating the clutch 4 to connect the engine 1 to the propeller shaft 3, whereupon the engine will operate the propeller of the ship to cause movement of same in a forward direction.

On the other hand, if it is desired that the ship move in an astern direction, the lever 57 is moved either from its neutral position, or from "Forward" position through its neutral position which causes stopping of the engine, to its "Astern" position at the opposite end of slot 92 to thereby actuate the starter control valve device 88 to supply fluid under pressure to pipe 8 for causing the engine 1 to be started in the reverse direction. The lever 57 may be then moved away from the end of slot 92 into alignment with slot 94 and then into the latter slot for actuating the clutch control device 60 to supply fluid under pressure to pipe 68 for operating the clutch 4 to connect the engine to the propeller shaft 3 for causing movement of the ship in an astern direction.

It will be seen that with lever 57 in slot 92 the clutch control pipe 68 will be opened to atmosphere by way of the clutch control device 60 to effect operation of the clutch 4 to disconnect the engine 1 from the propeller shaft 3. Connecting the engine to the propeller shaft is obtained only upon movement of the lever into either slot 93 or slot 94. The slot 92 provides for starting of the engine in either one direction or the reverse direction before actuating the clutch 4 for connecting the engine to the propeller shaft and also ensures disconnecting the engine from the propeller shaft before reversing the engine.

Within the housing a spring seat 96 mounted on lever 57 rests on a shoulder 97 provided on the lever in substantial alignment with the upper end of cage 52. A friction shoe 100 is slidably mounted on lever 57 between the spring seat 96 and inner surface 98 of the top wall of the casing. A coil spring 99 under pressure encircles the lever 57 and is supported at one end on the spring seat 96 and bears at the opposite end against the friction shoe 100 for constantly urging said shoe against the inner surface 98 of the casing.

The inner surface 98 is substantially in the shape of an inverted V in the direction of the length of slot 92 and in said surface adjacent each of the opposite ends of said slot is a recess 101 arranged to receive the shoe 100 upon movement of the lever into alignment with either of the slots 93 or 94. With the shoe 100 engaging the surface 98 at any point between the two recesses 101 the force of the spring 99 against said shoe is operative to automatically return the lever 57 to its neutral position shown in Fig. 3. When the shoe 100 is in either of the recesses 101, the lever 57 is held against movement toward neutral position. By this arrangement it is necessary for the operator to move the lever 57 substantially to either one end or the other of slot 92 in order that the lever will not return to its neutral position shown upon removal of manual force on the lever. This insures adequate movement of the lever to cause starting of the engine in either one direction or the opposite, as desired, and also provides for the lever being held in its clutch engaging positions in slots 93 or 94 due to interlocking of the friction shoe 100 within the recesses 101, and also due to the fact that the surface 98 lengthwise of these recesses is arranged at substantial right angles to the normal or neutral position of lever 57 in slot 92.

A clutch and speed interlock device 75 is secured to the casing over the opposite end of rock shaft 51. This device comprises a piston 76 having at one side a chamber 77 open to the speed or power output control pipe 31. Projecting from the opposite face of piston 76 is a plunger 78 which slidably extends through a suitable axial bore in the adjacent end of shaft 51 into alignment with the peripheral surface of the operating member 55 directly opposite that engaged by the plunger 70. The operating member 55 has a notch or recess 79 provided in its periphery in such a position as to receive the end of plunger 78 when the lever 57 is in slot 92 in which the clutch 4 disconnects the engine 1 from the propeller shaft. A coil spring 80 encircling the plunger 78 bears at one end against the adjacent end of rock shaft 51 and the opposite end bears against piston 76 in opposition to pressure of fluid effective in chamber 77.

As above described, the speed or output of engine 1 is varied according to the pressure of fluid supplied to act in pipe 31, and opening of said pipe to atmosphere provides for idling operation of said engine. The pressure of spring 80 on piston 76 in the interlock device 75 is such as to move said piston and plunger 78 to the position shown when the pressure in pipe 31 and thereby chamber 77 is at a chosen low degree, or substantially that of the atmosphere if desired, and to permit the piston to move the plunger 78 against the operating member 55 when the pressure in said pipe is increased above that degree. Thus if engine 1 should be operating at a speed above the chosen low degree with the lever 57 in slot 92, the plunger 78 will enter recess 79 and prevent turning of member 55 and thus maintain the clutch 4 in the position disengaging engine 1 from the propeller shaft 3. To rock the lever 57 in either direction from the clutch disengaging position shown in Fig. 2 to cause operation of clutch 4 to connect engine 1 to the propeller shaft 3, the pressure in the speed control pipe 31 and piston chamber 77 on the interlock piston 76 must therefore be reduced to a degree which provides for operation of the engine at the chosen reduced speed. When this occurs, spring 80 will move the piston 76 and plunger 78 to the position shown in Fig. 2 in which the plunger 78 is removed from notch 79. When this condition exists, the lever 57 may be moved into either of the slots 93 or 94 for actuating the clutch 4 to connect the engine to the propeller shaft 3. In other words, the interlock valve device 75 controlled from the speed control pipe 31 prevents the operator moving lever 57 into either of the slots 93 or 94 for actuating the clutch 4 to connect the engine 1 to the propeller shaft 3 when the engine is operating at a speed above a chosen low degree.

The manual control device 46 may be identical to the manual control device 45 and like reference numerals have therefore been applied to the main corresponding portions of the control device 46. In Fig. 2 it will be seen that the clutch control device 60, interlock valve device 75, and operating member 55 are disposed in the control device 46 just the reverse of corresponding parts in the control device 45 but this in no way changes the operation of the engine 2 as controlled by the starting control device 18 or of clutch 5 in response to operation of lever 57 in the control device 46 in slots 92, 93 and 94 which are identical to corresponding slots providing for controlling movement of lever 57 in the control device 45. The operator may, therefore, move lever 57 of the control device 46 upward in slot 92, as viewed in Fig. 1, to "Forward" position for causing starting of the engine 2 in a direction to propel the ship forwardly and then into the slot 92 for actuating clutch 5 to connect the engine to the propeller shaft 3, or he may move said lever to the opposite end of slot 92 to "Astern" position for causing starting of the engine 2 in a direction for moving the ship in an astern direction and then move said lever into slot 94 for actuating the clutch 5 to connect said engine to the propeller shaft 3, these operations being the same as in the control device 45 and producing the same results with respect to engine 2. Moreover, movement of lever 57 of the control device 46 to actuate clutch 5 to connect engine 2 to the propeller is subject to control by the respective interlock device 75 the same as above described in connection with the control device 45.

If the operator desires to connect both engines 1 and 2 to the propeller shaft 3 at the same time for driving the ship, he may move both levers 57 in the same direction to either one end or the opposite end of slots 92 and then into either slots 93 or 94, respectively, as will be apparent.

However, if one engine is already connected to the propeller shaft at the time it is desired to connect the other engine to said shaft, the interlock device 75 of the controller 45 or 46 controlling the latter engine requires that the pressure in the speed control pipe 31 be such as to provide for idling operation not only of the respective engine, as above described, but also of the other engine and thereby of the propeller shaft 3, since said interlock device is controlled by the same pressure as controls the speed of the other engine. The interlock valve device thus precludes the possibility of connecting either engine to the propeller shaft when said shaft is being driven by the other engine operating at a speed above idling.

Summary

It will now be seen that each of the manually operative control devices 45 and 46 provides for selective control of a plurality of different devices by means of a single controlling lever. The lever is carried by and so connected to a rock shaft as to be capable of rocking said shaft for controlling one of the devices. The connection between the rock shaft and lever also provides for rocking movement of said lever in a direction lengthwise of the rock shaft, without rocking the rock shaft, for actuating a plunger carried axially of the rock shaft for controlling another of the devices. Means carried by the rock shaft axially thereof are also provided for interlocking with the lever to prevent rocking movement of the lever lengthwise of the rock shaft in order to prevent a certain undesired operation. In order to ensure a desired squence of operations, means are provided to prevent operation of the lever to rock the rock shaft while operating the plunger therein and to prevent operation of said plunger while rocking the rock shaft.

Having now described my invention, what I claim as new and desire to secure by Letters Patent is:

1. A device for controlling the operation of two separate devices comprising a casing, a rock shaft journaled in said casing for controlling one of said devices and having a slot extending diametrically therethrough, a member disposed in said slot, and having a journal connection with said rock shaft diametrically thereof, said member being rockable relative to said rock shaft for operating the other of said devices and being operable upon movement in a direction about the axis of said rock shaft for rocking said rock shaft, a lever associated with said member for operating same, a plunger at one side of said slot slidably mounted in an axial bore in said rock shaft, said member having a recess for receiving said plunger in one position of said member for holding said member against movement relative to said rock shaft but providing for rocking movement of said rock shaft, and means for controlling movement of said plunger into and out of said recess.

2. A device for controlling the operation of two separate devices comprising a casing, a rock shaft journaled in said casing for controlling one of said devices and having a slot extending diametrically therethrough, a member disposed in said slot and having a journal connection with said rock shaft diametrically thereof, said member being rockable relative to said rock shaft and being operable upon movement in a direction about the axis of said rock shaft for rocking said rock shaft, a lever associated with said member for operating same, a plunger at one side of said slot slidably mounted in an axial bore in said rock shaft, said member having a recess for receiving said plunger in one position of said member for holding said member against movement relative to said rock shaft but providing for rocking movement of said rock shaft, means for controlling movement of said plunger into and out of said recess, and another plunger at the opposite side of said slot slidably mounted in an axial bore in said rock shaft and engaging said member, the portion of said member engaged by the last named plunger constituting a cam operative upon movement of said member about its axis to effect movement of the last named plunger axially of said rock shaft, the last named plunger controlling the other of said devices.

3. A device for controlling the operation of two separate devices comprising a casing having two spaced bearings, a rock shaft journaled in said bearings for controlling one of said devices and having between said bearings a slot extending diametrically therethrough, an element mounted on said shaft between and engaging the adjacent ends of said bearings, a pin arranged at right angles to said slot extending diametrically through said shaft at opposite sides of said slot and through said element securing said rock shaft against axial movement, a member disposed in said slot and journaled on said pin for rocking movement to control the other of said devices, said member being operable upon movement in a direction about the axis of said rock shaft to rock said rock shaft, and means associated with said member for operating same relative to said rock shaft.

JOHN N. GOOD.